United States Patent
Jongboom et al.

(12)

(10) Patent No.: US 6,482,341 B1
(45) Date of Patent: Nov. 19, 2002

(54) BIODEGRADABLE MOULDINGS

(75) Inventors: Remigius Oene Jules Jongboom, Zetten; Peter Iwan Stuut, Wageningen; Jan Arie Rodenburg, Bergschenhoek, all of (NL)

(73) Assignee: Rodenburg Biopolymers B.V., Oosterhout (NL)

( * ) Notice: Subject to any disclaimer, the term of this patent is extended or adjusted under 35 U.S.C. 154(b) by 0 days.

(21) Appl. No.: 09/581,024

(22) PCT Filed: Dec. 8, 1998

(86) PCT No.: PCT/NL98/00704

§ 371 (c)(1),
(2), (4) Date: Dec. 11, 2000

(87) PCT Pub. No.: WO99/29733

PCT Pub. Date: Jun. 17, 1999

(30) Foreign Application Priority Data

Dec. 8, 1997 (NL) .............................................. 1007735
Jun. 19, 1998 (NL) .............................................. 1009449

(51) Int. Cl.$^7$ .......................... B29C 44/02; B29C 67/02
(52) U.S. Cl. ........................... 264/50; 264/53; 264/115; 264/122; 264/299
(58) Field of Search ........................... 264/50, 53, 109, 264/122, 115, 299

(56) References Cited

U.S. PATENT DOCUMENTS

| | | | | | |
|---|---|---|---|---|---|
| 4,167,588 A | * | 9/1979 | Willard | ........................ | 426/283 |
| 4,526,093 A | * | 7/1985 | Fogerson | ........................ | 99/584 |
| 4,615,893 A | * | 10/1986 | Fogerson | ........................ | 426/481 |
| 4,735,818 A | * | 4/1988 | Wheatley | ........................ | 426/637 |

FOREIGN PATENT DOCUMENTS

| | | |
|---|---|---|
| DE | 4020969 C1 | 7/1991 |
| EP | 0169106 A1 | 1/1986 |
| EP | 0506650 A2 | 9/1992 |
| GB | 5099 | 3/1916 |
| GB | 100675 | 6/1916 |

OTHER PUBLICATIONS

Arti Arora et al., "Extruded Potato Peel Functional Properties Affected by Extrusion Conditions," Journal of Food Science, vol. 58, No. 2, 1993, pp. 335–337.

* cited by examiner

*Primary Examiner*—Allan R. Kuhns
(74) *Attorney, Agent, or Firm*—Young & Thompson

(57) ABSTRACT

A process is described for the production of mouldings based on biological material, wherein potato skins, optionally in the presence of a plasticiser such as glycerol or urea and lecithin and of a water-resistant biodegradable polymer such as polylactic acid, is subjected to a thermomechanical treatrment such as extrusion and then shaped. The mouldings have good mechanical properties and a good biodegradability.

19 Claims, No Drawings

BIODEGRADABLE MOULDINGS

The invention relates to mouldings made from biological residual material, such as potato skins.

For numerous applications, such as profiles, pipes, channels, pots and other containers, there is a need for biodegradable mouldings that can be produced from inexpensive materials. For applications of this type it has been proposed to process starch, if appropriate mixed with other polymers and fillers, and to shape this, for example by means of extrusion. Examples of this are described in WO 92/02559 and EP-A-707034. However, products of this type have a number of disadvantages, including high production costs and high processing temperatures.

Surprisingly it has now been found that potato skins can be processed in a relatively simple and inexpensive process to give robust, but nevertheless readily degradable mouldings. The process according to the invention therefore encompasses the processing of potato skins or similar material by the application of thermomechanical treatment and shaping. It is assumed that the combination of starch, cellulose, pectin, cork and inorganic materials is responsible for the advantageous mechanical properties and the relatively high resistance to water of the mouldings, for example in comparison with the properties of material based on pulp.

The starting material used is potato skins, that is to say the residual material produced in any process for peeling potatoes. The most common method of peeling is steam peeling, in which potatoes are heated for approximately 30 seconds with steam under elevated pressure, after which the skins are removed from the potatoes using a water jet. The skin material thus obtained does not require further pretreatment; at most any residues of sand or soil are removed if necessary. Skins obtained by scraping, shaving and other mechanical processes can also be used. Residual material from other crops, such as cassava skins and chaff from wheat or other grain, can be used as the starting material instead of or in combination with potato skins.

In addition to the residual material, other biodegradable material such as starch, cellulose (derivatives), guar gum, carob flour, tragacanth, pectin, gum arabic or other gums, natural rubber, polyesters such as polycaprolactone and polylactic acid, proteins such as gluten and casein can also be used. In particular the co-use of protein hydrolysis products and biodegradable polyesters is advantageous because the dimensional stability and the waterproof characteristics of the final moulding can be increased in this way. Examples of proteins and protein hydrolysis products are hydrolysed keratin, gluten and zein. Examples of water-resistant degradable polyesters are polylactic acid and polycaprolactone. Polylactic acid has the additional advantage that it is available as an inexpensive material as a result of acidification of the skin material. The lactic acid thus formed can be separated off therefrom, for example in vapour form, after which it is polymerised in the conventional manner and the polymer is added back to the skin material. The quantity of material such as protein or polyester which is added can vary from a few percent up to, for example, 60%, based on the dry skin material. Especially in the case of larger quantities (for example 20–60%) the added material can serve as continuous phase. The material added can be added before, during or after the thermomechanical treatment and before the shaping treatment. If the material is added after the thermomechanical treatment, a mixing step, for example a kneading step, must then be employed. An added protein (hydrolysis product) or polysaccharide can, if necessary, be partially crosslinked during the thermomechanical treatment so that a polymer network is produced. The customary crosslinking agents, such as dialdehydes, diamines, epichlorohydrin and the like can be used for crosslinking, in amounts of, for example, 0.1–10% by wt with respect to the crosslinkable material.

The skin material can also be chemically slightly modified, for example by oxidation.

The skins can be comminuted prior to the thermomechanical treatment. Said comminution can be effected in any conventional manner, for example by grinding, sieving, pureeing or scraping. A plasticiser such as a polyol (glycol, diethylene glycol or another alkylene glycol or polyalkylene glycol, glycerol, glycerol monoester and the like), citric acid ester or urea is then preferably added to the skins, although water alone can also suffice. The quantity of water is preferably 3–35% by wt with respect to the total amount of degradable polymer. The quantity of additional plasticiser, such as glycerol, is preferably 0–25% by wt. An emulsifier or flow improver such as lecithin or a monoglyceride (for example 0.5–5% by wt), a solvent such as an oil (for example castor oil), fatty acid or metal salt thereof (for example calcium stearate) can also be added. To increase the strength and/or volume of the mouldings a filler such as a natural fiber, for example flax, straw, elephant grass, cotton, jute or paper, can be added, for example in an amount of 5–50% by wt with respect to the skin material. Inorganic fillers such as lime or chalk can also be added. The addition of lime can further increase the water resistance of the end product by lowering the solubility of pectin. Other possible additives are colorants, preservatives and in particular swelling or blowing agents such as sodium bicarbonate and nucleating substances such as talc.

The mixture of comminuted skins and additives is then subjected to a thermomechanical treatment. During this operation it can be brought into granule/pellet form in accordance with granulating or pelletising processes known per se, for example by extrusion in a twin screw extruder at elevated temperature (60–180° C., in particular 100–150° C.). The size of the granules is determined by the rate of granulation and any grinding steps following granulation. Depending on the presence of other plasticisers, the water content during extrusion can vary from 3 to 35% by wt.

The product obtained can be conditioned to a moisture content optimum for the process. Depending on the content of other plasticisers, the moisture content after conditioning varies between 4 and 30%. The conditioned product can then be introduced into a mould having the shape of the product finally to be produced. If the conditioned product is in the form of granules, a quantity of adhesive (for example a mixture of a native starch and glycerol) can be added in order to promote the adhesion between the granules during shaping.

Shaping can be effected by casting, injection moulding, pressing and similar techniques. If voluminous products are desired, shaping can be effected by foaming with the aid of a blowing agent, such as carbon dioxide, lower alkanes or, in particular, water. A suitable method of foaming is, for example, foaming making use of electromagnetic radiation, in particular that in the microwave range (frequency between 20 MHz and 10 GHz and in particular between 50 MHz and 5 GHz). For this operation use is made of the absorption of radiant energy by water, glycerol or other dipolar substance present in the product, said substance heating up within a very short time and being converted into the vapour form. During this operation two processes proceed simultaneously: firstly foaming as a consequence of evaporation of water or the other dipole-containing substance. The advantage here is that no thermal energy has to be supplied from outside. Secondly, the loose material will simultaneously be "welded" together to form a three-dimensional foam moulding. For this purpose it is important that the outside of the granules is meltable, for which an at least partially thermoplastic behaviour of the treated skin material is required. Such a foaming process must take place rapidly, that is to say within a few seconds. This can be achieved by using a microwave source of high power (up to, for example, 50 kW) or by using a combination of microwave generator and mould in which the pressure can be varied rapidly. After the material has been brought into the desired foam shape in this way the mould is opened and the product is removed.

The products obtained using the process according to the invention can have any desired shape. An important application is that of continuous mouldings, such as profiles, tubes, channels, sheets and the like. Such mouldings can be porous, for example when used as a covering for an article which is to swell in an aqueous medium. Discontinuous articles, such as pots, boxes and the like, can also be produced. One example thereof is packaging, for example for fragile equipment, glassware, articles for posting and the like. The product can also be in the form of spheres, discs and the like which can be used as fill material in packages. Advantages of this material are its natural antistatic properties, the fact that water-soluble variants are possible and the biodegradability and compostability. In the case of foamed material the low density is also an advantage for many applications.

Depending on the desired application, it can be useful to apply a protective coating to the moulding obtained. Such a coating can be, for example, a wax coating or a polymer coating. Polymers which can be used for this purpose are thermoplastic or thermosetting polymers, depending on the treatment and the application, such as a natural rubber or a polyester, preferably a degradable polyester such as a polylactic acid or poly-ε-caprolactone.

EXAMPLE 1

Drying of the Skins

Before the potato skins were dried the moisture content thereof was determined by placing 200 g skin slurry in an oven and leaving to stand for 3 days at 120° C. The moisture content was determined from the decrease in weight of the skin slurry.

The skins were dried with the aid of a drum drier. Wet skin slurry was scooped onto a drum at a temperature of 150° C., as a result of which the water evaporated and dry skin of potato slurry was produced on the drum. The skin was scraped off the drum and collected.

Pressing

In order to investigate the flow possibilities of the dried potato skins a few pressing experiments were carried out with dried product. The pressing experiments were carried out using a Pasadena Hydraulics Inc. PHI 75U press. The material was pressed at a temperature of 110° C. and a pressure of 20 tonne for 10 minutes. The press was then cooled for 10 minutes, after which the product was removed from the press. The pressing experiments were carried out with various glycerol and water contents. The glycerol and water contents were both varied from 0 to 20%.

Extrusion

Granulation of the potato skins was carried out using 2 different extruders:

the Berstorff ZE 40, a self-cleaning, co-rotating twin screw extruder with a diameter (D) of 40 mm and a length (L) of 38 D.

the Extruco TSE 76, a close-fitting, counter-rotating twin screw extruder with a diameter (D) of 76 mm and a length (L) of 33.8 D.

Batches of approximately 5 kg were made up per composition. The batches were first premixed for 10 minutes using a Bear varimixer (a type of large food mixer). The premixes were fed to the extruder by means of a hopper. The speed of revolution of the screw for the experiments was 35 rpm. The extrudate was collected in a tray and chopped into granules using a granulator. During extrusion the type and the quantity of plasticiser, the type of potato skins and the quantity of lime added were varied. All samples contained 3% lecithin.

type of plasticiser: glycerol, urea quantity of plasticiser: 0, 5, 7.5, 10, 15% (based on the weight of the skins)

type of skins: skins obtained by steaming, homogenised material from steam peeling, grey starch (this is also a waste product from steam peeling of potatoes)

lime: 0, 5, 10%.

Injection Moulding

Injection moulding of the various test bars was carried out using an Ergotech NC IV injection moulding machine. Injection moulding of the flower pots was carried out using a Demag D60NCII-K injection moulding machine. The moulds used were a mould for test bars and a flower pot mould for thin-walled flower pots. The types of granulate, made by means of extrusion, were dried before injection moulding and processed at a temperature of 120° C. The injection moulding pressure was between 1000 and 2500 bar; the cycle time was between 27 and 37 seconds depending on the type of granulate. The moulding temperature was kept at 20° C.

TABLE 1

Results of bending test and tensile test

| Composition | | | Mechanical properties | | | |
| --- | --- | --- | --- | --- | --- | --- |
| Glycerol (%) | Urea (%) | Lime (%) | Modulus of elasticity (N/mm$^2$) | Max. load (N/mm$^2$) | L at max. load (%) | L at break (%) |
| 5 | — | — | 72 | 1.8 | 6.8 | 13.1 |
| 7.5 | — | — | 34 | 1.0 | 7.5 | 13.2 |
| 10 | — | — | 46 | 1.5 | 8.2 | 13.2 |
| 12.5 | — | — | 23 | 0.8 | 7.4 | 13.1 |
| 15 | — | — | 29 | 1.1 | 8.7 | 13.2 |
| 25 | — | — | 6 | 0.3 | 9.0 | 13.4 |
| — | 5 | 10 | 10 | 0.4 | 12.0 | 20.8 |
| — | 10 | 10 | 6 | 0.3 | 11.8 | 23.0 |
| — | 5 | 10 | 6 | 0.3 | 11.1 | 19.0 |
| — | — | — | 2500 | 30 | 1.2 | 1.2 |
| — | — | — | 1600$^1$ | 26$^1$ | 2$^1$ | 2$^1$ |

$^1$tensile test

The mechanical properties of the test bars obtained (bending text except for the last: tensile test) after conditioning at 60% relative humidity are summarised in Table 1. In this table the modulus of elasticity is a measure of the stiffness, max. load the maximum force exerted on a bar during the bending test, L at max. load the elongation at the time of subjection to maximum load and L at break the elongation at the point in time when the material breaks.

EXAMPLE 2

Kneading Experiments with Mixtures of Skin Plastic and Polycaprolactone

The blending experiments on skin plastic (see Example 1) with polycaprolactone (PCL) were carried out with the aid of a Haake Rheomix 600 batch kneader with roller rotors. This kneader had 3 zones that could be heated individually. One zone could be cooled with the aid of compressed air. A thermocouple, with which the temperature of the melt could be determined, was placed in the kneader chamber. A premix of skin granulate containing 3% lecithin mixed therein (percentage moisture content 18%) was mixed with PCL granulate and kneaded for 10 minutes at 100 rpm, after which the kneader was stopped and the material was removed from the kneader. The following conditions and premixes were run: kneading temperature: 80, 100, 120° C. percentage PCL: 20, 35, 45, 55% (percent by weight based on skin granulate solids). The result was a well mixed kneaded product at all temperatures used and for all percentages PCL used. If a screw speed of 80 instead of 100 was used at 80° C. and 20% PCL, the result was granular and not well mixed.

EXAMPLE 3
Kneading Experiments with Mixtures of Skin Plastic and Polylactic Acid The blending experiments with skin plastic and polylactic acid were carried out analogously to Example 2. The following conditions and premixes were run: kneading temperature: 120, 150° C. percentage PLA: 30%, 35%. The result was a well mixed kneaded product at the temperatures used and for the percentages polylactic acid used.

EXAMPLE 4
Extrusion Experiments with Mixtures of Skin Plastic and Cellulose Diacetate The blending experiments on skin plastic with cellulose diacetate were carried out in a Werner & Pfleiderer ZSK 25 extruder. This is a self-cleaning, co-rotating twin screw extruder. Skin granulate, consisting of fermented potato skins obtained by steaming that had been subjected to thermoplastic processing (percentage moisture content 13–18%) containing 3% lecithin or 10% water, was premixed with cellulose diacetate (Cell-diA) in a Bear varimixer and metered with the aid of a K-Tron K2M T85 volumetric feeder to the extruder. During the experiments the screw speed of the extruder was 200 rpm. The temperature profile of the extruder was as follows (zone–set temperature–measured temperature, °C.): 1—170, 2—180, 3—180—181, 4—180–181, 5—190— 191, 6—190—190, 7—180—181. The process conditions are given in Table 2 ($M_d$=torque, measure of mechanical input as % of maximum motor power; P=pressure at the nozzle (output) of the extruder).

TABLE 2

| Additives | $T_{melt}$ (° C.) | P (bar) | Screw speed (rpm) | $M_d$ (%) | Observations |
|---|---|---|---|---|---|
| 3% lecithin 30% Cell-diA | 180 | 30–100 | 201 | 35 | High pressure up to 100 bar plus high torque |
| 10% water 50% Cell-diA | 180 | — | 201 | — | Foaming outflow |

What is claimed is:

1. A process for the production of mouldings based on a biological material, comprising extruding potato skins to form granules or pellets, and shaping said granules or pellets into a moulding.

2. The process according to claim 1, wherein the extrusion is carried out in the presence of a plasticiser.

3. The process according to claim 2, wherein said plasticiser is selected from the group consisting of polyols and ureas.

4. The process according to claim 1, wherein said shaping is carried out in the presence of a blowing agent.

5. The process according to claim 4, wherein said blowing agent is selected from the group consisting of water vapor and carbon dioxide.

6. The process according to claim 1, wherein 1–50% by weight of a fibrous material is added to said potato skins, said fibrous material is selected from the group consisting of finely divided paper, straw, flax, elephant grass, cotton and jute.

7. The process according to claim 6, wherein 5–25% by weight of said fibrous material is added to said potato skins.

8. The process according to claim 1, wherein said potato skins are mixed with 5–60% by weight of a polysaccharide, a protein or protein hydrolysis product or a water-resistant biodegradable polyester before, during or after a thermomechanical treatment.

9. The process according to claim 8, wherein the water-resistant, biodegradable polyester is polylactic acid or polycaprolactone.

10. The process according to claim 9, wherein said polylactic acid has been obtained by polymerization of lactic acid originating from the potato skins.

11. The process according to claim 8, wherein the polysaccharide, protein or protein hydrolysis product is crosslinked during said thermomechanical treatment.

12. The process according to claim 1, wherein 0.5–5% by weight of lime is added to the potato skins before the extrusion.

13. The process according to claim 1, wherein a coating of wax or a polymer is applied to the shaped product.

14. The process according to claim 1, wherein said granules or pellets contain 5–25% by weight water just before shaping.

15. A process for the production of mouldings based on a biological material, comprising:

subjecting potato skins to a thermomechanical treatment, adding 1–50% by weight of a fibrous material to said potato skins, wherein said fibrous material is selected from the group consisting of finely divided paper, straw, flax, elephant grass, cotton and jute, and shaping said thermomechanically treated potato skins into a moulding.

16. The process according to claim 15, wherein 5–25% by weight of said fibrous material is added to said potato skins.

17. The process according to claim 16, wherein 0.5–5% by weight of lime is added to said potato skins before said thermomechanical treatment.

18. A process for the production of mouldings based on a biological material, comprising:

subjecting potato skins to a thermomechanical treatment, adding 0.5–5% by weight of lime to said potato skins before said thermomechanical treatment, and shaping said thermomechanically treated potato skins into a moulding.

19. The process according to claim 18, further comprising adding 1–50% by weight of a fibrous material to said potato skins, wherein said fibrous material is selected from the group consisting of finely divided paper, straw, flax, elephant grass, cotton and jute.

* * * * *